(12) United States Patent
Durvasula et al.

(10) Patent No.: US 8,694,361 B2
(45) Date of Patent: Apr. 8, 2014

(54) IDENTIFYING AND MANAGING STRATEGIC PARTNER RELATIONSHIPS

(75) Inventors: Sastry VSM Durvasula, Phoenix, AZ (US); Janice Law, Surrey (GB); Sandeep K. Sacheti, Edison, NJ (US); Mary Weissman, Mesa, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 628 days.

(21) Appl. No.: 11/833,870

(22) Filed: Aug. 3, 2007

(65) Prior Publication Data

US 2008/0177589 A1 Jul. 24, 2008

Related U.S. Application Data

(60) Provisional application No. 60/870,226, filed on Dec. 15, 2006.

(51) Int. Cl.
*G06Q 10/00* (2012.01)

(52) U.S. Cl.
USPC .......................................................... 705/7.38

(58) Field of Classification Search
USPC ............................................................ 705/1
See application file for complete search history.

(56) References Cited

U.S. PATENT DOCUMENTS

| 6,185,543 | B1 * | 2/2001 | Galperin et al. ................ 705/38 |
|---|---|---|---|
| 6,839,680 | B1 | 1/2005 | Liu et al. |
| 7,047,212 | B1 * | 5/2006 | Pych et al. ................... 705/27.1 |
| 7,246,077 | B1 * | 7/2007 | Pych ............................ 705/7.31 |
| 7,421,406 | B2 * | 9/2008 | Dixon et al. ................. 705/36 R |
| 7,702,555 | B1 * | 4/2010 | Breeden et al. ............. 705/36 R |
| 7,720,761 | B2 * | 5/2010 | Trench et al. ................... 705/42 |
| 7,822,757 | B2 * | 10/2010 | Stoker et al. .................. 707/758 |
| 2002/0035504 | A1 * | 3/2002 | Dver et al. ...................... 705/10 |
| 2002/0062241 | A1 * | 5/2002 | Rubio et al. .................... 705/10 |
| 2004/0044536 | A1 | 3/2004 | Fitzpatrick et al. |
| 2004/0044664 | A1 * | 3/2004 | Cash et al. ........................ 707/9 |
| 2005/0177505 | A1 * | 8/2005 | Keeling et al. ................. 705/40 |
| 2007/0041562 | A1 * | 2/2007 | Bernier .................... 379/265.01 |

OTHER PUBLICATIONS

Pych, Joseph; "Method and Systems for Enabling Privacy Control in a Prospect List Database"; U.S. Appl. No. 09/662,362, May 16, 2006 (date of publication at least as by incorporated by reference in Pych, US 7,047,212).*

International Search Report and Written Opinion for PCT Application No. PCT/US2007/025575, mailed Nov. 6, 2008.

USPTO; Office Action dated Apr. 13, 2010 in U.S. Appl. No. 11/833,899.

USPTO; Final Office Action dated Jul. 27, 2010 in U.S. Appl. No. 11/833,899.

(Continued)

*Primary Examiner* — Leland Marcus
(74) *Attorney, Agent, or Firm* — Snell & Wilmer L.L.P.

(57) ABSTRACT

Systems and methods that identify and manage partner relationships are disclosed. A third-party trustee collects and processes confidential customer information from more than one interested parties. The third-party trustee acts as a neutral intermediary between the parties. The third-party trustee processes and analyzes the information received from the various parties to identify mutual and/or prospective customers between the interested parties. The processing results may then be used for further analysis to help at least one of the interested parties to improve their marketing efforts, risk management, and servicing of their customers.

16 Claims, 7 Drawing Sheets

(56) References Cited

OTHER PUBLICATIONS

USPTO; Advisory Action dated Sep. 29, 2010 in U.S. Appl. No. 11/833,899.
USPTO; Office Action dated Nov. 1, 2010 in U.S. Appl. No. 11/833,899.
Business Wire ("Amdocs and SAS Partner to Help Global Communication Service Providers Create Stroner, More Profitable Customer Relationships; Amdocs logo." Feb. 14, 2005, Business Wire, New York.
USPTO; Office Action dated May 6, 2011 in U.S. Appl. No. 11/833,899.
USPTO; Advisory Action dated Apr. 25, 2011 in U.S. Appl. No. 11/833,899.
USPTO; Final Office Action dated Feb. 17, 2011 in U.S. Appl. No. 11/833,899.
USPTO; Final Office Action dated Sep. 12, 2011 in U.S. Appl. No. 11/833,899.
USPTO; Advisory Action dated Oct. 25, 2011 in U.S. Appl. No. 11/833,899.
Office Action dated Jun. 4, 2012 in U.S. Appl. No. 11/833,899.
Final Office Action dated Aug. 29, 2012 in U.S. Appl. No. 11/833,899.
Advisory Action dated Oct. 23, 2012 in U.S. Appl. No. 11/833,899.
Office Action dated May 30, 2013 in U.S. Appl. No. 11/833,899.

\* cited by examiner

IDENTIFYING AND MANAGING STRATEGIC PARTNER RELATIONSHIPS

CROSS REFERENCE TO RELATED APPLICATIONS

This application claims priority to U.S. Provisional Patent Application No. 60/870,226, filed Dec. 15, 2006, which is hereby incorporated by reference in its entirety. This application is also related to commonly owned, co-pending U.S. application Ser. No. 11/833,899, filed on even date herewith, entitled "Strategic Partner Recognition," and, which is incorporated herein by reference in its entirely.

BACKGROUND OF THE INVENTION

1. Field of the Invention

The present invention relates to methods and systems for identifying strategic partnerships and customer relationships.

2. Related Art

Credit card providers and merchants are continuously seeking to find ways to present and offer purchasing incentives to customers. For example, if a customer shows an affinity for flying on a particular airline, and choosing to stay at a particular hotel chain, then it is to the advantage of the airline, hotel, and credit card provider to offer packaged incentives. The packaged incentives may require the customer to use the respective credit card when purchasing a package deal for both the airline tickets and hotel accommodations. What is needed is a system, method and computer program product to identify such potential mutual customers and potential strategic partnerships between merchants.

BRIEF DESCRIPTION OF THE INVENTION

Amongst other things, the present invention meets the above-identified needs by providing a system, method and computer program product that identifies and manages partner relationships. The systems, methods, and programs presented herein provide that a third-party trustee collect and process confidential customer information from a plurality of interested parties. The third-party trustee acts as a neutral intermediary between the parties. The third-party trustee processes and analyzes the information received from the various parties to identify mutual and/or prospective customers between the interested parties. The processing results may then be used for further analysis to help one or more of the interested parties to improve their marketing efforts, risk management, and servicing of their customers.

BRIEF DESCRIPTION OF THE FIGURES

The features and advantages of the present invention will become more apparent from the detailed description set forth below when taken in conjunction with the figures, which are hereby incorporated in the specification.

DETAILED DESCRIPTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Figure 1:
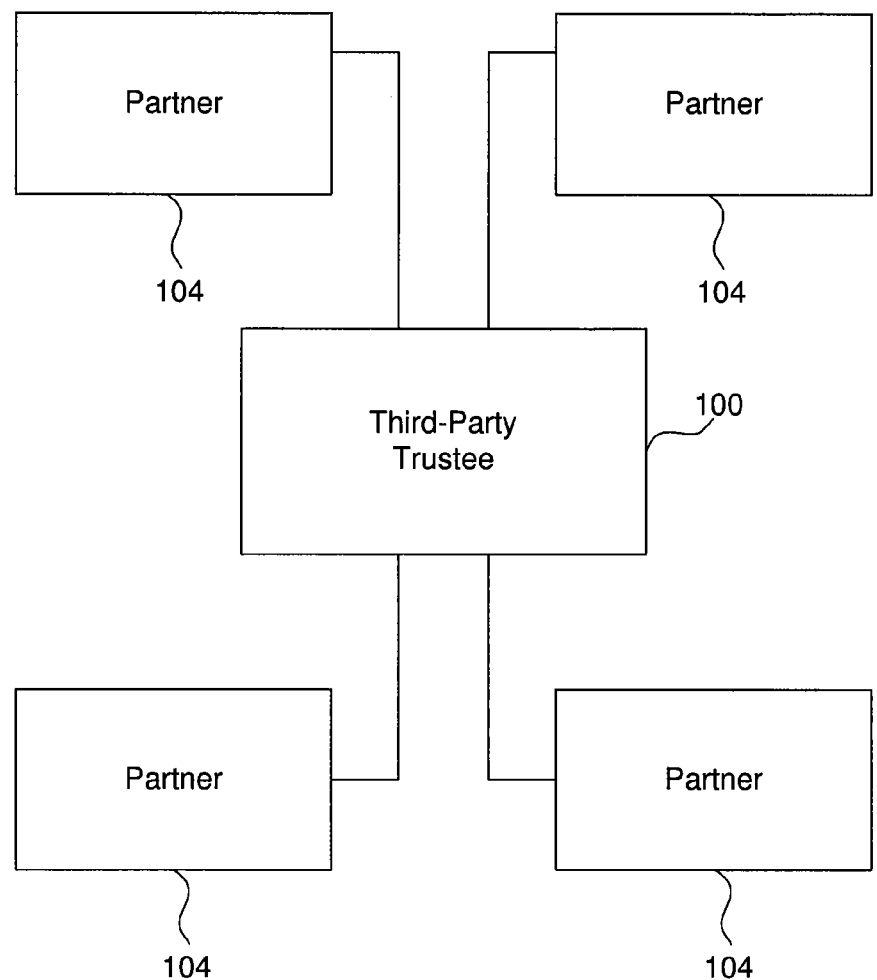
FIG. 1 is a high-level schematic drawing illustrating the relationships between the parties that partake in the presented methods.

FIG. 1 is a high level schematic drawing illustrating the relationships between the parties that partake in the presented methods. A plurality of partners 104 are shown having business relationships with a third-party trustee 100. The term "partner" is used to herein define an entity that shares information or opportunities with, or is otherwise associated with, another entity for a particular purpose. The term "partner" is not intended to be limited by the legal definition of "partner" or "partnership." While four partners 104 are shown, the presented methods may be implemented between any two or more partners. Each partner 104 may be a vendor or merchant, such as for example a retailer, manufacturer, service provider, or a transaction service provider, such as for example a credit card company, a charge card company, a debit card company, a bank, or any other financial institution. Third-party trustee 100 may be any entity that serves as a trusted intermediary between partners 104. For example, third-party trustee 100 may be a credit bureau, a bank, or any other entity that may serve as an information escrow service. The term "information escrow service" is intended to mean a service provided by a neutral third-party to receive and process information, from a plurality of interested parties, in a secure and confidential manner.

Normally, each partner 104 collects information on their respective customers. Each partner 104 may collect, for example, their customers' names, addresses, business affiliations, purchasing preferences, frequency of purchases, spending habits, spending limits, or any other valuable customer and customer behavior information. As used herein, the term "customer behavior information" is intended to broadly encompass any and all information collected by a given partner with respect to any given customer. In practice, two or more partners may find it beneficial to share such information, to thereafter strategically market to any given customer with specific and focused marketing campaigns. The collected customer behavior information, however, usually contains sensitive and/or confidential information. As such, partners 104 may have reservations against sharing such information. However, in accordance with the presented systems and methods, partners 104 may enter into contractual relationships with third-party trustee 100 to thereby deliver to third-party trustee the customer behavior information. Third-party trustee 100 can then serve as an information escrow and management service. Third-party trustee 100 also serves to identify strategic partnerships that might be formed between partners. The term "strategic partnership" is meant to define a relationship between two or more partners for a targeted objective.

Under the arrangement shown in FIG. 1, each partner 104 provides third-party trustee 100 with customer behavior information. Third-party trustee 100 then organizes, processes, and/or analyzes the customer behavior information.

For example, third-party trustee 100 may sort through customer lists and customer behavior information to identify mutual customers between at least two of the plurality of partners 104. By providing partners 104 with a list of mutual customers, the partners can then organize and create strategic relationships to market to the various mutual customers.

For example, if one partner is a hotel chain and one partner is an airline, identification of mutual customers may provide the partners with an opportunity to offer a packaged deal wherein a mutual customer flies with the airline and stays at a hotel within the hotel chain. The mutual customer information thereby helps the partners push these customers to spend additional money with the partners, and helps the partners strengthen loyalty with their mutual customers. These targeted incentive programs are more effective because they target known mutual customers. Further, the cost of these incentive programs, and marketing campaigns, are shared between the partners, thereby minimizing each individual partner's marketing overhead. Ultimately, the decreased costs and increased effectiveness of these marketing campaigns lead to increased profits.

Third-party trustee 100 may also identify additional customer relationships such as identifying a prospective customer for a partner. For example, if a customer is a loyal reader of a mountain biking magazine, then a mountain bike retailer may form a strategic partnership with the magazine to provide incentives for the customer to purchase equipment with the retailer. Such a strategic partnership would push the customer to spend with the retailer, and would also strengthen the customer's loyalty with the magazine. The term "customer relationships" is used herein to define mutual customers amongst partners and/or mutual prospective customers amongst partners.

Figure 2:
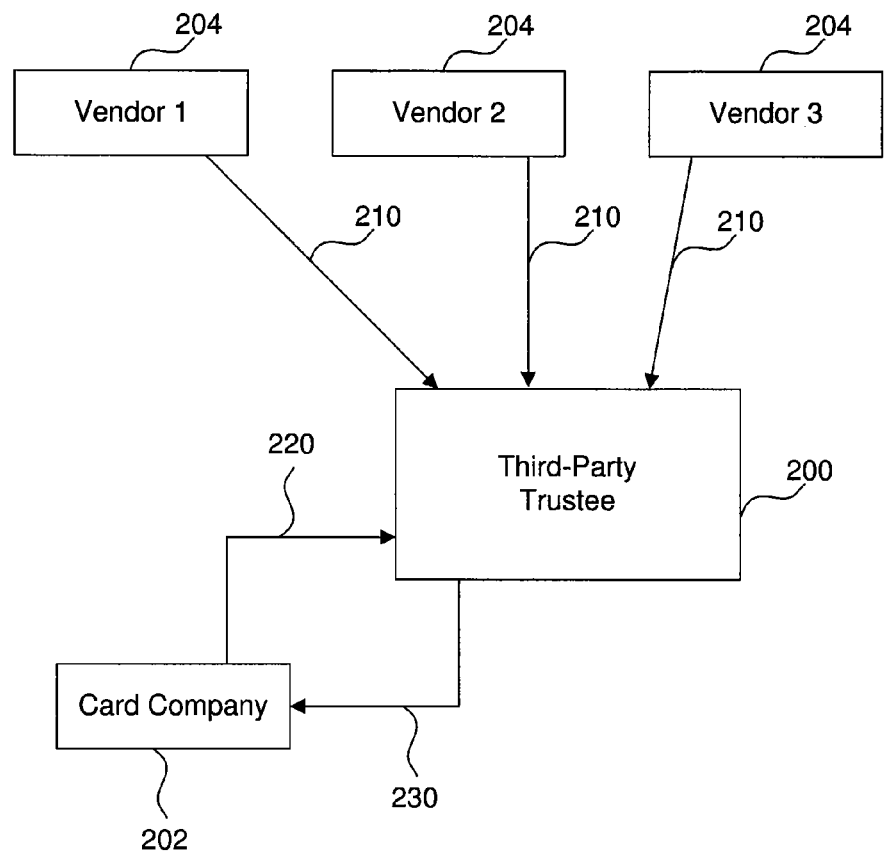
FIG. 2 is a schematic view of one embodiment of the present invention.

FIG. 2 is a schematic view of one embodiment of the present invention. As shown in FIG. 2, a third-party trustee 200 receives data from a first partner, such as Card Company (CC) 202, and at least one other partner, such as vendors 204. More specifically, third-party trustee 200 receives information 220 from CC 202, which includes card member lists, card member information, identified strategic partner lists, etc. From each vendor 204, third-party trustee receives customer behavior information 210, which includes customer lists, individual customer data, prospective customer lists, prospective customer data, customer sales history, etc.

After receiving information 220 from CC 202, and customer behavior information 210 from vendors 204, third-party trustee 200 conducts a strategic partnership analysis (SPA) to determine the respective customer relationships between the vendors 204 and CC 202. The SPA includes processing all of the received data through matching algorithms to determine various customer relationships. For example, if third-party trustee 200 is to identify mutual customers between vendors 204 and CC 202, third-party trustee 200 implements matching algorithms that search through the customer lists of the four entities and identifies the names and customer behavior information of the customers who are on all four of the customer lists. The results 230 from the SPA are returned to CC 202 so that CC may further analyze the customer relationships, establish potential strategic partnerships, and refine existing strategic partnerships. CC 202 may further prepare and offer incentive programs to mutual customers and/or prospective customers based on the customer relationships and strategic partnerships identified by the SPA results 230.

In addition, third-party trustee 200 may perform other processing functions. For example, if each partner 204 delivers data to third-party trustee in a different form, then third-party trustee 200 may standardize the data received from partners 204 before any further processing. Third-party trustee 200 may also process the data received from partners 204 in order to identify any error records. Further, third-party trustee 200 may maintain a database that keeps track of changes to customer behavior information 210 over a given time. As such, third-party trustee 200 can identify changes in customer behavior information, such as a change in address, a change in spending parameters and habits, a change in shopping locations, etc.

In an alternative embodiment, CC 202 may indicated to third-party trustee 200 that a specific partner has already been recognized as a strategic partner. If so, CC 202 may direct third-party trustee 200 to prioritize all input files received from such partner, and thereafter process and deliver the SPA results for that partner in an expedited fashion.

Figure 3:
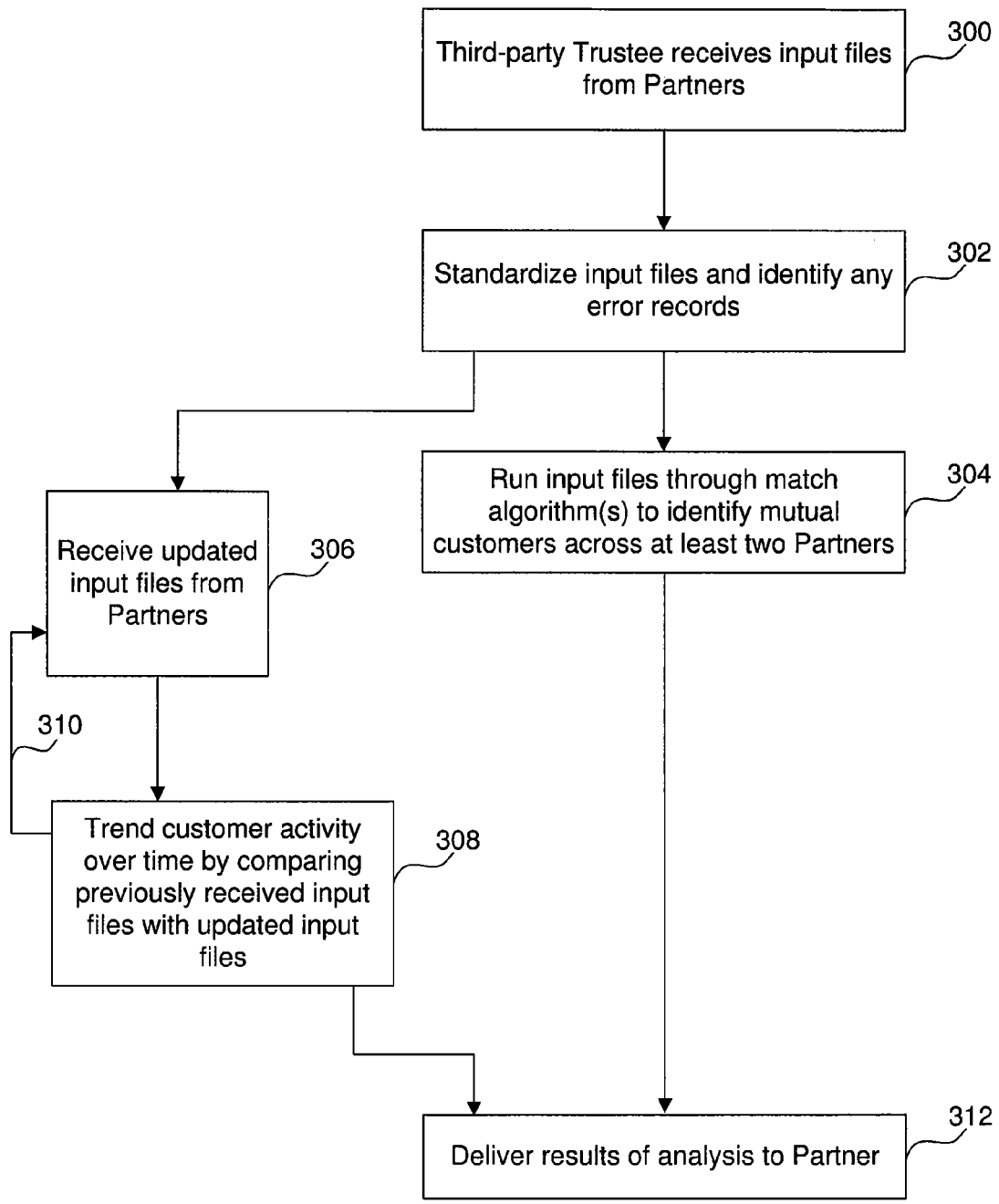
FIG. 3 is a flowchart illustrating one embodiment of the present invention.

FIG. 3 is a flowchart illustrating a method in accordance with one embodiment of the present invention. In step 300, a third-party trustee receives input files from a plurality of partners. In step 302, the partners input files are standardized and checked for errors. Standardization of the input files may be necessary due to the fact that the partners deliver input files with varying amounts of information and data categories. For example, some partners may only provide a list of customer numbers. Other partners may provide a list of customer names and loyalty program membership points. Other partners may provide detailed customer behavior information. In step 304, third-party trustee runs matching algorithms to identify mutual customers across at least two of the partners. Preferably, third-party trustee runs matching algorithms across all of the partners and all of the input files. In an alternative embodiment, third-party trustee may run the matching algorithms across only a specific partner pair (e.g., CC 202 and a single vendor 204; or between two vendors 204).

While the matching algorithms are being processed in step 304, a parallel process is occurring in step 306. In step 306, third-party trustee continues to receives updated input files from partners. For example, partners may deliver updated input files to third-party trustee in intervals of once a day, once a week, once a month, once a quarter, or any other interval deemed to be appropriate. The updated input files are also processed through the matching algorithms to identify mutual customers across at least two of the partners. The processing of updated input files allows for a trending analysis to determine changes in the customer behavior information over time. The trend analysis identifies changes in customer behavior information by comparing the previously received input files with the updated input files, as illustrated in step 308. Ultimately, the results of the analysis are delivered to a partner, such as a card company, in step 312.

Figure 4:
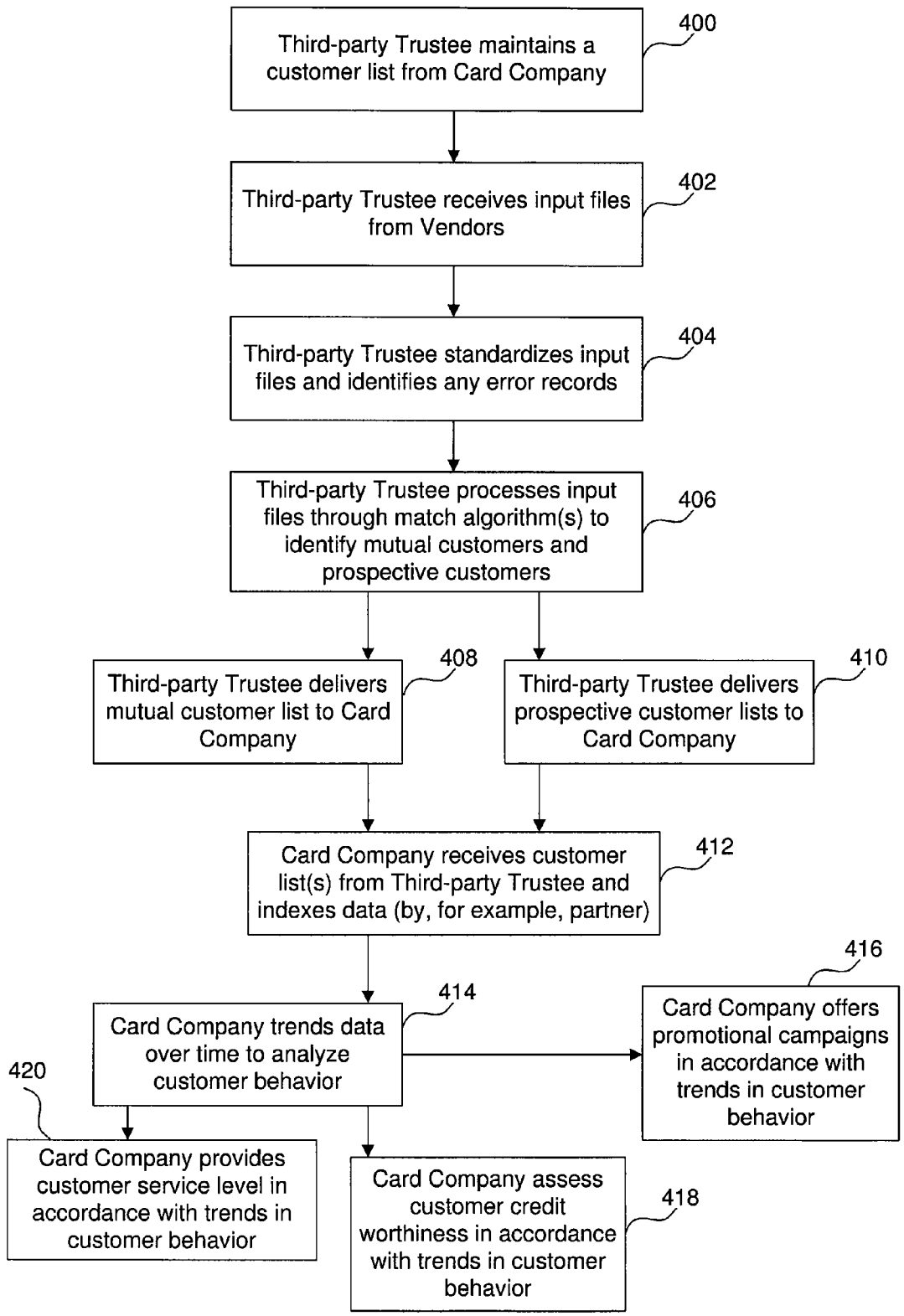
FIG. 4 is a flowchart illustrating an alternative embodiment of the present invention.

FIG. 4 is a flowchart illustrating an alternative embodiment of the present invention. In step 400, a third-party trustee maintains a customer list from a card company. In step 402, third-party trustee receives input files from various vendors, as diagramed in FIG. 2. In step 404, third-party trustee standardizes the input files and identifies any error records. In step 406, third-party trustee processes the input files through matching algorithms to identify mutual customers between card company and at least one of the vendors, and prospective customers for the card company. In practice, card company may maintain a contractual security agreement with the individual vendors. In some cases, a vendor may allow card company access to both its mutual customers and its prospective customers. In some cases, however, a vendor may only allow card company access to its mutual customers. Therefore, in step 408, third-party trustee delivers a mutual customer list to card company. If allowed, and in accordance with card company's security agreement with vendor, third-party trustee delivers a prospective customer list to card company in step 410. The mutual customer list and/or the prospective customer list may contain any and all customer behavior information allowed under the applicable security agreement. The mutual customer list of step 408 is generally a list of customers that are both customers to one of the vendors and to card company. The prospective customer list of step 410 is a list of customers who are customers to one or more vendors, but not customers of card company.

In step 412, card company receives the mutual customer list and/or the prospective customer list from third-party trustee. Card company then appropriately indexes the data. Card company may index the data, for example, by respective partners, or vendors. Card company may also index the data by customer name or customer identification number, or any other means that it deems appropriate. In step 414, card company trends the data over time to analyze the customer behavior information. When card company determines trends in the customer behavior information, card company may then be able to identify strategic partnerships, customer relationships, patterns in customer behavior, and more. For example, card company may identify a pattern wherein a particular customer travels with a certain airline, stays with a certain hotel chain, and rents a car from a certain rental company. Once such customer behavior information is identified, card company may form a strategic partnership with the airline, hotel chain, and rental company, and thereafter provide promotional incentives to push spend and to push loyalty.

The trending analysis of the customer behavior information may be used to improve card company's marketing, risk management, and service. For example, analysis of customer behavior information helps card company tailor marketing or promotional campaigns to target specific customers with specific tendencies, as shown in step 416. Such a focused marketing campaign produces better results at lower costs. Also, customer behavior information analysis helps card company in making risk management decisions. Because card company can analyze a customer's behavior patterns, card company can use such information when assigning credit lines, assigning loyalty factors, assessing probabilities of write offs, making decisions to extend credit on marginal thresholds, or making decisions to extend credit limits to the customer, as shown in step 418. Card company may also use such customer behavior information to service its customers. For example, if card company determines that one of its customers is a loyal customer of a strategic partner, card company may offer the customer a higher level of service, as shown in step 420, based solely on the customer's relationship with the strategic partner. Customers appreciate such benefits and are therefore inclined to be loyal to the strategic partner and card company.

Figure 5:
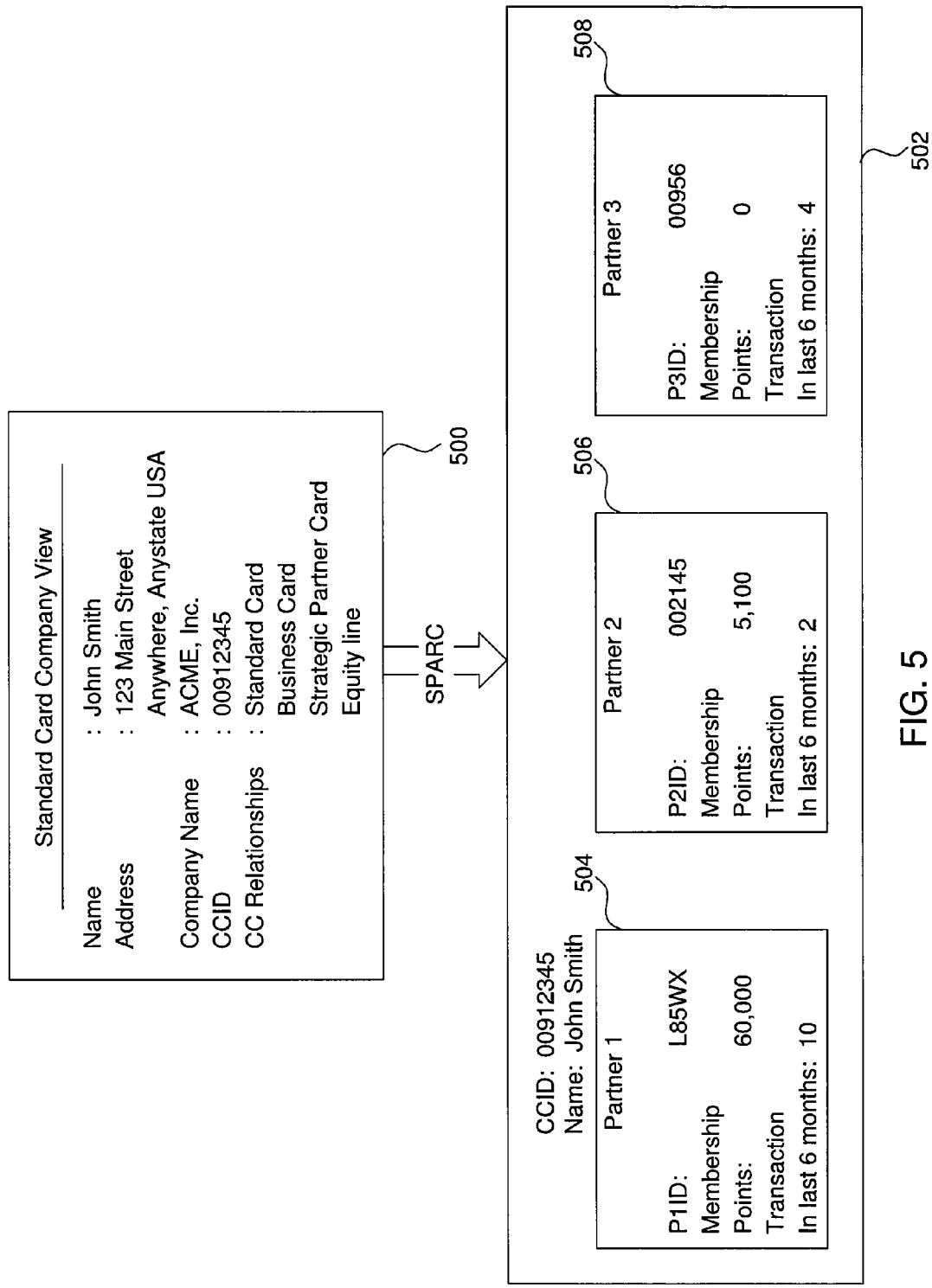
FIG. 5 is a diagram illustrating how information is organized and stored in one embodiment of the present invention.

FIG. 5 is a diagram illustrating how information is organized and stored in one embodiment of the present invention. Box 500 shows how information about a card company's customer is traditionally organized and stored. A standard card company's view of a customer may include the customer's name, address, company name, identification number, and relationships with the card company. After the processing of the methods described herein (herein referred to as "SPARC" or "SPARC processing"), the customer's information is organized and stored, for example, to include the additional information shown in box 502. As shown, a card company may organize and store the customer's information based on the customer's identification number, or name, and then have an index with information based on information received from the various partners. For example, information received from the SPARC processing is organized and stored in boxes 504, 506 and 508. As shown, such organization is a more robust analysis of the customer's behavior information because a card company can view and analyze various customer relationships across multiple partners.

Figure 6:
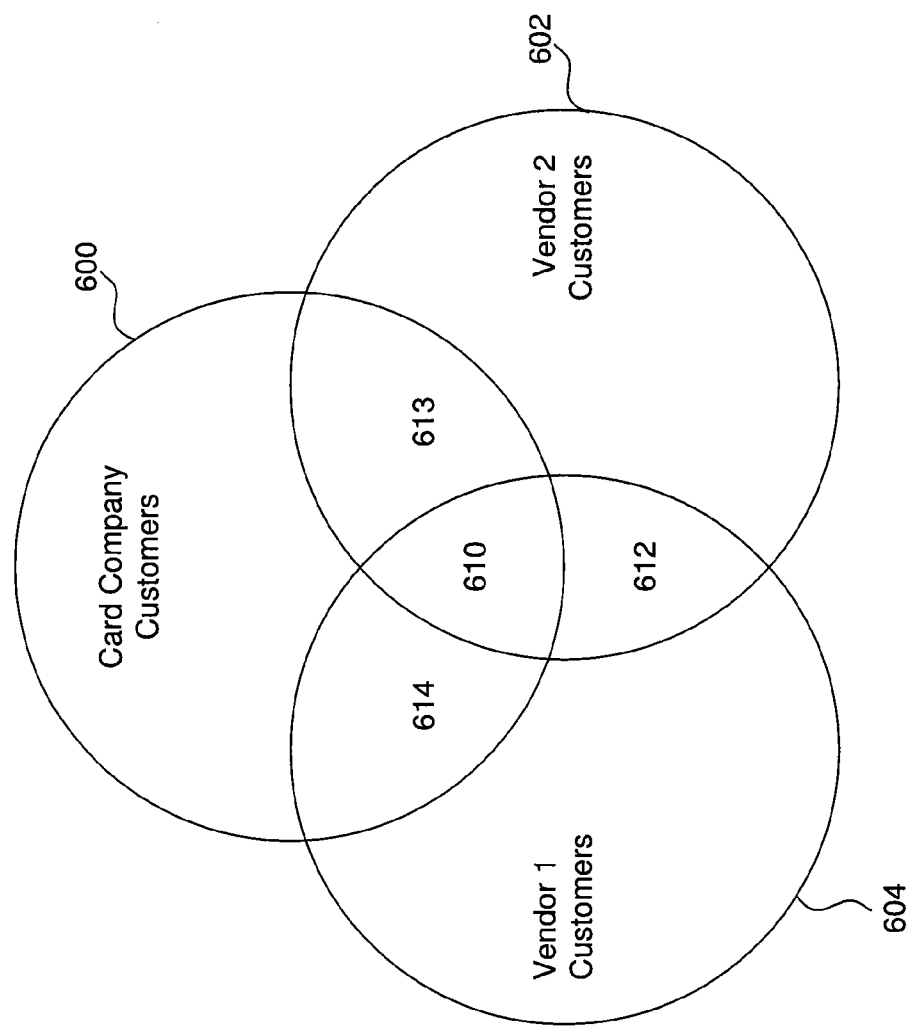
FIG. 6 is a diagram illustrating some of the objectives of the present invention.

FIG. 6 is a diagram illustrating some of the objectives of the SPARC processing. In FIG. 6, circle 600 represents the card company's customers. Circle 602 represents customers of vendor 2. Circle 604 represents customers of vendor 1. Section 610 represents mutual customers between all three partners (card company, vendor 1, and vendor 2). Section 612 represents customers of vendor 1 and vendor 2, but not of card company. Section 613 represents customers of vendor 2 and card company, but not of vendor 1. Section 614 represents customers of card company and vendor 1, but not of vendor 2.

The SPARC processing allows the partners to identify which customers are representative of the various sections 610, 612, 613, and 614. By identifying such customers, the partners can improve their marketing, risk management, and servicing of their customers. For example, the partners may prefer to form a strategic partnership to maximize the customers represented in section 610. As such, first the partners will identify the customers representative of section 610 using SPARC processing. Identification of such customers will allow the partners to provide targeted marketing campaigns to these customers, extended credit lines, and/or improve servicing of these customers. These offers push spending across the partners and drive loyalty across the partners. Also, the strategic partnership may agree to share marketing costs, thereby lowering each individual partner's costs.

Further, SPARC processing allows card company to identify mutual customers between vendor 1 and vendor 2, who are not customers of card company, as represented by section 612. Card company may then reach out to the customers of section 612 and provide promotional incentives to become a card company customer. For example, card company may offer the customers of section 612 with discounts for their continued loyalty to vendors 1 and/or vendors 2, if the customers open an account with card company. Likewise, card company may offer promotional discounts to customers in section 613 and 614, pushing such customers to spend with vendor 1 and/or vendors 2.

The presented methods, or any part(s) or function(s) thereof, may be implemented using hardware, software or a combination thereof and may be implemented in one or more computer systems or other processing systems. However, the manipulations performed by the methods were often referred to in terms, such as matching or selecting, which are commonly associated with mental operations performed by a human operator. No such capability of a human operator is necessary, or desirable in most cases, in any of the operations described herein which form part of the methods. Rather, the operations may be machine operations. Useful machines for performing the operation of the methods include general purpose digital computers or similar devices.

In fact, in one embodiment, the invention is directed toward one or more computer systems capable of carrying out the functionality described herein. An example of a computer system is shown in FIG. 7.

Figure 7:
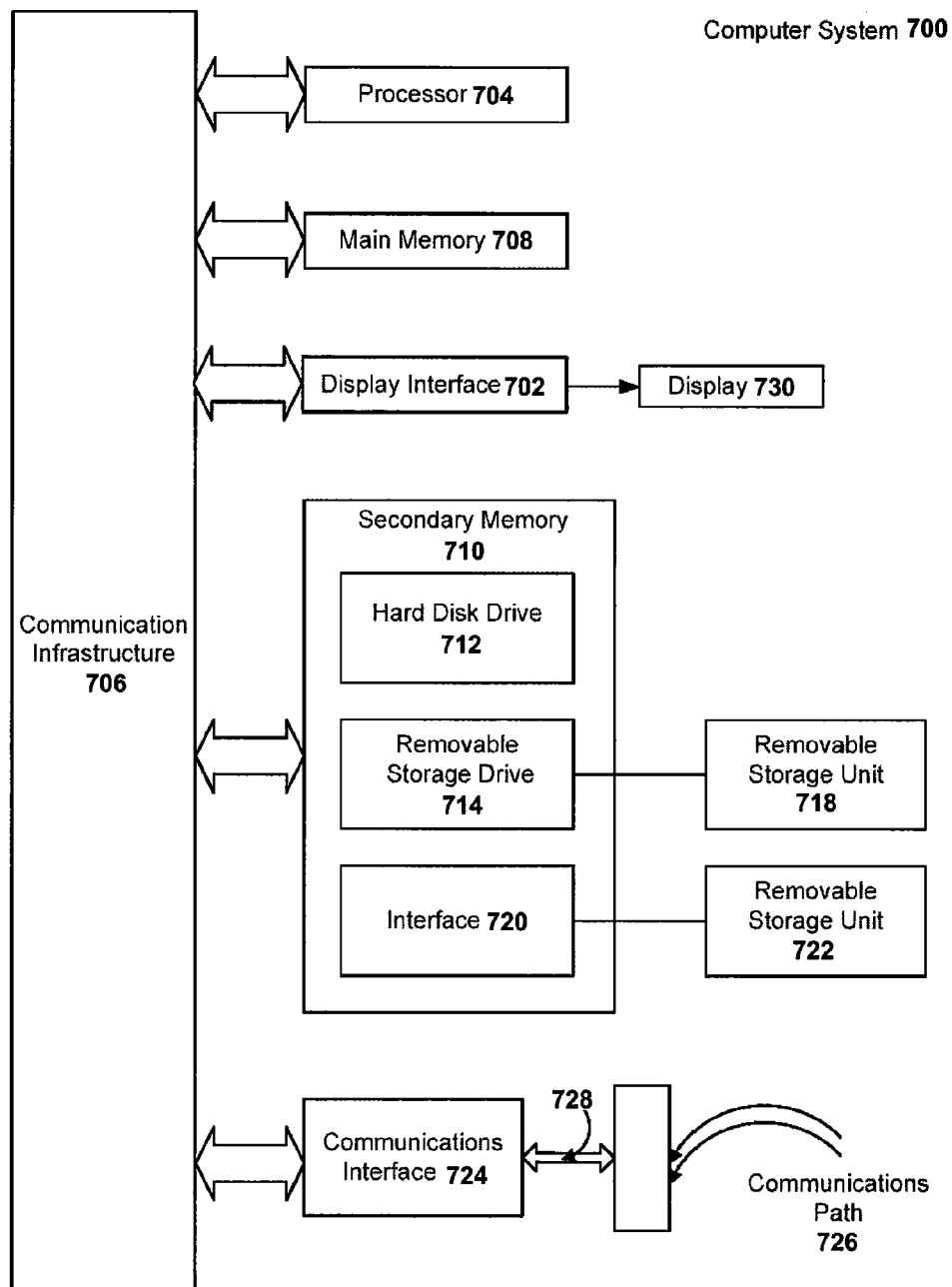
FIG. 7 is a schematic drawing of a computer system used to implement the methods presented herein.

FIG. 7 shows a computer system 700 having one or more processors, such as processor 704. The processor 704 is connected to a communication infrastructure 706 (e.g., a communications bus, cross-over bar, or network). Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar devices for allowing computer programs or other instructions to be loaded into computer system 700. Such devices may include, for example, a removable storage unit 718 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 718 and interfaces 720, which allow software and data to be transferred from the removable storage unit 718 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 714 and a hard disk installed in hard disk drive 712. These computer program products provide software to computer system 700. The invention is directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features of the present invention, as discussed herein. In particular, the computer programs, when executed, enable the processor 704 to perform the features of the presented methods. Accordingly, such computer programs represent controllers of the computer system 700.

In an embodiment where the invention is implemented using software, the software may be stored in a computer program product and loaded into computer system 700 using removable storage drive 714, hard drive 712 or communications interface 724. The control logic (software), when executed by the processor 704, causes the processor 704 to perform the functions and methods described herein.

In another embodiment, the methods are implemented primarily in hardware using, for example, hardware components such as application specific integrated circuits (ASICs). Implementation of the hardware state machine so as to perform the functions and methods described herein will be apparent to persons skilled in the relevant art(s). In yet another embodiment, the methods are implemented using a combination of both hardware and software.

EXAMPLES

Example 1

The above described SPARC processing systems and methods provide a full customer relationship analysis which enables targeted marketing. In one example, a customer may have an existing profitable relationship via a transaction card, such as a standard Platinum Credit Card available from the American Express Company, New York, N.Y., but does not spend as much on their incentivized American Express Gold Card. Upgrading such a customer to an incentivized Platinum Card at a low rate may drive the customer to spend more on their incentivized Platinum Card. If the incentivized Platinum Card has a lower profitability for the card company than the standard Platinum Credit Card, knowing about the existence and depth of this relationship will mitigate such cannibalization. Further, use of SPARC processing will consolidate a given individual partner activity—across partners (e.g., spend, usage, loyalty)—and as such, card company may target merchant offers to drive relevant point of sale opportunities. Further, the information received from the SPARC processing will provide a view of customers across multiple partners and thus facilitate very specific and targeted marketing offers. For example, the vendors and card company may target customers who travel on a specific airline and stay at a specific hotel chain with a combined offer of bonus points/miles when the customer books a trip via the card company's travel service, using their card company card, choosing certain destinations, flying with the airline, and staying at the hotel. The information received from the SPARC processing will be available within customer marketing capabilities and can be used during campaign modeling to facilitate efficient processing and campaign effectiveness. Finally, SPARC processing results may be indicative of trends, which may provide insight into suspect or fraudulent activity.

Example 2

In another exemplary embodiment, there is provided a method of analyzing customer behavior. The method comprises the steps of: providing a third-party trustee with a master customer list containing a list of customer names; and directing a partner to provide the third-party trustee with a partner list at a first point in time, the partner list including a list of the partner's customer names and respective partner customer behavior information for each partner customer on the partner list. The method also comprises the steps of: requesting the third-party trustee to provide a mutual customer list, wherein the mutual customer list includes a list of mutual customer names and respective partner customer behavior information for each customer whose name is on both the master customer list and the partner list. The method further includes: directing the partner to provide the third-party trustee with an updated partner list at a second point in time, the updated partner list including a list of partner customer names and respective partner customer behavior information for each partner customer on the updated partner list; and requesting the third-party trustee to provide a updated mutual customer list, wherein the updated mutual customer list includes a list of mutual customer names and respective partner customer behavior information for each customer (e.g., an individual, company or other entity) whose name is on both the master customer list and the updated partner list. The method further comprises: creating a database including the list of mutual customer names and the respective partner customer behavior information for customers on the mutual customer list and the updated mutual customer list; and detecting changes in the respective partner customer behavior information for at least one customer who is on both the mutual customer list and the updated mutual customer list.

The method may further comprise, providing at least one mutual customer with an incentive program. If the first point in time is before the mutual customer is provided with the incentive program, and the second point in time is after the mutual customer is provided with the incentive program, then the method may further comprise, evaluating how the incentive program affected customer behavior for the at least one mutual customer. In alternative embodiments, the method may further comprise: providing at least one mutual customer with a customer service level in accordance with the changes in respective partner customer behavior information; assessing at least one mutual customer's credit worthiness in accordance with the changes in respective partner customer behavior information; and/or entering into a contractual obligation with the partner to secure the partner customer names and respective partner customer behavior information for each customer on the partner list; and ensuring that each step in the method adheres to the contractual obligation. The method may also include maintaining a security policy to secure the partner customer names and respective partner customer behavior information for each customer on the partner list; and ensuring that each step in the method adheres to the security policy.

Example 3

In another exemplary embodiment, there is provided a method of analyzing customer behavior. The method includes the steps of: maintaining a master customer list having a list of customer names and respective master customer behavior information; providing a third-party trustee with at least the list of customer names from the master customer list; directing the third-party trustee to receive a first partner list from a first partner, the first partner list including a list of first partner customer names and first partner customer behavior information for each customer on the first partner list; directing the third-party trustee to receive a second partner list from a second partner, the second partner list including a list of second partner customer names and second partner customer behavior information for each customer on the second partner customer list; and requesting the third-party trustee to identify mutual customers whose names are on the master customer list, the first partner list, and the second partner customer list. The method further includes: requesting the third-party trustee to provide a mutual customer list including the names of the mutual customers and their respective first partner customer behavior information and second partner customer behavior information; creating a database to synthesize the mutual customer list and respective first partner customer behavior information, second partner customer behavior information; and master customer behavior information; and analyzing the respective first, second, and master customer behavior information for at least one mutual customer to determine a pattern in the customer behavior.

The method may further include the steps of: providing the mutual customer with an incentive program in accordance with the pattern in the customer behavior; repeating, after the mutual customer has been provided with an incentive program, the method steps listed above; and evaluating how the incentive program affected customer behavior for the mutual customer. The method may further include providing the at least one mutual customer with a customer service level in accordance with the pattern in the customer behavior; or assessing the at least one mutual customer's credit worthiness in accordance with the pattern in the customer behavior.

Example 4

In yet another exemplary embodiment, there is provided a method comprising: receiving a first customer list from a first partner; receiving a second customer list from a second partner; receiving a third customer list from a third partner; identifying mutual customers across at least two of the partners; and delivering to the third partner a mutual customer list, wherein the mutual customer list includes names of the identified mutual customers. If the first customer list includes names of customers of the first partner and customer behavior information for each customer of the first partner, and the second customer list includes names of customers of the second partner and customer behavior information for each customer, the method may further include delivering to the third partner any available customer behavior information for each identified mutual customer.

The method may further comprise: receiving an updated first customer list from the first partner; identifying differences between the first customer list and the updated first customer list; and delivering to the third partner the identified differences with respect to identified mutual customers. The method may further comprise: receiving an updated second customer list from the second partner; identifying differences between the second customer list and the updated second customer list; and delivering to the third partner the identified differences with respect to the identified mutual customers. The method may further comprise: receiving instructions from the third partner indicating that the first partner is a priority partner; performing the steps of identifying differences between the first customer list and the updated first customer list, and delivering to the third partner the identified differences, prior to performing any processing of the second customer list. Additionally, the method may further comprise: identifying any error records in the first customer list; and/or delivering to the third partner a prospective customer list, wherein the prospective customer list includes a list of customers on the first customer list and the second customer list, but not on the third customer list.

Example 5

In another exemplary embodiment, there is provided a method comprising: maintaining a master customer list including names of customers of an entity; receiving data from a plurality of partners, wherein the data provided by each individual partner includes names and customer behavior information for customers of the individual partner; processing the data through a matching algorithm to identify mutual customers between the entity and at least one partner; and delivering to the entity a mutual customer list including the names and customer behavior information for the identified mutual customers. The method may further comprise:

identifying any error records in the data; and removing any duplicate information from the data; standardizing the data received from the plurality of partners before processing the data; and/or assigning at least one partner identification number to each identified mutual customer, wherein the partner identification number indicates which partner provided customer behavior information for the identified mutual customer. The method may further comprise: receiving updated data from at least one partner; identifying differences between the updated data and the previously received data; and delivering to the entity the identified differences with respect to identified mutual customers; receiving instructions from the entity indicating that at least one partner is a priority partner; processing the data received from the priority partner prior to performing any processing of data received from other partners; and/or identifying at least one prospective customer, wherein a prospective customer is, for example, an individual, company or other entity who is a customer of at least one partner, but is not a customer of the entity; and delivering to the entity information about the prospective customer.

Example 6

In another exemplary embodiment, there is provided a computer-readable storage medium that stores instructions executable by at least one processing device. The computer-readable storage medium comprises: first instructions that, when executed, cause the processing device to identify mutual customers between an entity and a partner; and second instructions that, when executed, cause the processing device to deliver a list of identified mutual customers. The computer-readable storage medium may further comprise: third instructions that, when executed, cause the processing device to identify any error records in the data; and fourth instructions that, when executed, cause the processing device to remove any duplicate information from the data. The computer-readable storage medium may further comprise: instructions that, when executed, cause the processing device to identify differences between updated data received from a partner and original data received from a partner; and instructions that, when executed, cause the processing device to deliver the identified differences with respect to the identified mutual customers. The computer-readable storage may also include: instructions that, when executed, cause the processing device to identify at least one prospective customer, wherein a prospective customer is a customer of at least one partner, but is not a customer of the entity; and instructions that, when executed, cause the processing device to deliver to the entity information about the prospective customer; or instructions that, when executed, cause the processing device to identify a priority partner; and instructions that, when executed, cause the processing device to process any data with respect to the priority partner prior to processing any data with respect to any other partner.

Example 7

In another exemplary embodiment, there is provided a computer-readable storage medium that stores instructions executable by at least one processing device. The computer-readable storage medium comprises: first instructions that, when executed, cause the processing device to analyze respective master customer behavior information and partner customer behavior information from a master customer list and a partner customer list to determine a pattern in customer behavior. The computer-readable storage medium may further comprise instructions that, when executed, cause the processing device to adhere to a security protocol. The medium further comprises instructions that, when executed, cause the processing device to index a list of mutual customers by respective partner. The computer-readable storage medium may further comprise instructions that, when executed, cause the processing device to index a list of mutual customers in accordance with patterns in customer behavior; or instructions that, when executed, cause the processing device to calculate a credit ranking for a mutual customer in accordance with a pattern in the respective customer behavior for the mutual customer. The computer-readable storage medium may further include instructions that, when executed, cause the processing device to prepare a promotional incentive to a customer on a prospective customer list.

Example 8

Provided below is a list of definitions and requirements for implementation of the above described methods in an example embodiment. The list of definitions and requirements may be provided by a card company (CC) to a third-party trustee (Trustee).

DEFINITIONS

APM—Account Portfolio Management

APM database—The CC Customer database held by Trustee.

Partner File—A file received by Trustee, from the vendor, to be processed through the SPA. The vendor will send Partner Files repeatedly over time. The assumption is the files will include the whole universe of vendor records, including new records and changes to records previously transmitted. Any records not sent by vendor will be considered deleted records. Deleted records should be retained by Trustee for research purposes, either in the database with a "delete" flag or in a separate "delete" flat file.

Change Detection—In order to maximize efficiency, Trustee will create a Change Detection database and capability to detect new or changed records for processing.

Change Detection ID—Trustee will assign a twenty-four byte unique ID to each record on the Partner File. This ID will be internal to Trustee and used to facilitate Change Detection and accurate data assignment. It will be also be assigned as the Loyalty Number when not provided by the vendor.

Matching Engine—The engine built by Trustee to match the Partner Files to APM database to thereby identify existing mutual customers.

Partner ID—A consistent four digit ID assigned by Trustee to each unique vendor. All incoming files from the same vendor will be assigned the same Partner ID. This ID can be alpha indicator (or alpha/numeric indicator) with letters that allow anyone looking at it to easily identify the associated vendor name.

Partner Input Generation Number—A five digit number assigned by Trustee to each incoming Partner File. This number starts at 00001 for the first file received for a vendor. It will increase by one each time a new file is received for this same vendor. For example, the first vendor file received will be assigned 00001, the second file received will be 00002.

Current Partner Output File Type—A one byte indicator of which type of output file Trustee is sending; for example: E=Errors, C=Customers, P=Partner Only, L=Loyalty No Matches.

Previous Partner Output File Type—Same as Current Partner Output File Type, but blank for new records.

Partner Output Generation Number—A five digit number assigned by Trustee, which increments by one with each type of output file sent to CC. For example, VNDR00001 will have three files for transmission to CC, so the numbers assigned will be VNDR00001E00001, VNDR00001C00001, VNDR00001P00001. The second vendor file will have 3 files sent to CC, so the numbers assigned will be VNDR00002E00002, VNDR00002C00002, VNDR00002P00002. Trustee will send a file for each file type each time an SPA is conducted. If the file is empty, Trustee will indicate in the header that the Total Message Count is Zero. If Trustee splits the file, the same Partner Output Generation number will be kept on all the datasets because a control file that has a list of the datasets will be sent.

Loyalty Number—An identifying number assigned by each vendor to each customer/record. Usually this number will be unique to the customer/record, but sometimes the vendor may assign the same identifying number to more than one customer/record. Some vendors will not provide a Loyalty Number per customer/record. When the vendor does not provide a Loyalty Number, Trustee can assign a Loyalty Number to the customer/record.

Occurrence Code—A three byte field populated with the number of occurrences of a vendor Loyalty Number within a Partner File. The indicator "001" can be assigned to all first occurrences, and can increment by one for each additional occurrence of the same Loyalty ID. The indicator "000" can be assigned to all records provided by vendor without a Loyalty Number.

Partner File Shipment Notification Form—A form developed by Trustee to be filled out by vendor with all the relevant details for Trustee to track incoming Partner Files. Trustee can provide written procedures for use of this form.

Partner Setup Form—A form developed by Trustee to be filled out by CC and submitted to Trustee with all the relevant details for setting up a new Partner to be processed through SPA. MIS Only and Restricted Partners can be identified within this form.

Restricted Partner—A partner whose data is non-displayable for Partner Only, Error and Loyalty No Match records.

MIS Only Partner—A partner who's data is not to be shared with CC except as rolled up MIS reports.

Priority Partners—Vendors who CC defines as a critical partner whose information is to be processed as soon as received. These partners need not wait for the standard periodic cutoffs for SPA processing and need not be processed with the Standard Partner files. Preferably, CC will limit the number of Priority Partners. Each Priority Partner can have a different file layout Standard Partners—All vendors, to be considered strategic partners, but not defined as Priority Partners. Standard Partners can be processed together according to a standard periodic schedule.

Duplicates—Partner Records with identical Loyalty Number, Name hash and Address hash.

Duplicate Threshold—An adjustable parameter defining the acceptable percentage of duplicates for processing. If a Partner File exceeds the threshold, then Trustee is to hold processing for that Partner File only and contact CC.

Partner File Date Received—Gregorian date YYYY-MM-DD when Trustee received the file from vendor.

Partner File Date Processed—Gregorian date YYYY-MM-DD when Trustee processes the file from vendor.

Partner Restriction Code—Field indicating any restrictions on the Partner File; for example: R is Restricted; M is MIS Only; N is No Restriction. This field should preferably not be blank.

Total Number of Records—Number of records for a vendor in the output file, excluding Header record.

Partner Record Type—H=Header record which is going to be the first record for each Partner file. It will precede the Partner Detail records. D=Partner Detail Record Partner Input Record Length—Length of each input Partner Record which is fixed for each Partner.

Persons skilled in the relevant arts will understand the breadth of the terms used herein and that the exemplary descriptions provided are not intended to be limiting of the generally understood meanings attributed to the foregoing terms.

The general requirements for the Trustee are listed below. Requirements:

Trustee must have the ability to handle multiple input files for SPARC processing. For example, there could be 40-150 unique Partner Files with different layouts.

Most of the files will come directly from the vendor, while some may come from CC. When possible, files will be sent via a network, but very large files may be shipped via optical or magnetic storage media.

For each file sent to Trustee, vendors will provide a completed Partner File Shipment Notification Form to Trustee. Trustee requires receipt of this form for tracking incoming files and acknowledging their receipt for input into SPA processing. This notification form will be sent to CC.

Each Partner File will have a different record layout. Trustee will have the ability to map varying input layouts from multiple Partner Files into a standard input layout/file for processing and sending standardized output to CC which includes fixed fields plus varying fields for the customized vendor's input data.

Vendor's selected layout will remain consistent per vendor. Trustee will have, for example, three weeks to convert a new Partner File before processing the file through SPARC. Trustee will have, for example, three weeks to accommodate changes to an existing Partner File layout before processing the file through SPARC.

Trustee is to provide a capability to detect changes in the Partner Files. Trustee is to assign an internal 24 byte Change Detection ID to help identify new or changed records for processing. For repeat files, for example, new and changed records, and unchanged Partner Only records, will be processed through the complete SPA capability to detect if they now have an existing CC account. Unchanged Mutual Customer records will go to APM database for refresh of indicators and to pick up the most accurate CC Customer Account number for return to CC. All Partner records received will be returned to CC in output files although not all the data will be returned for Restricted or MIS Only Partners.

Partner Files may contain duplicates. Trustee is to process first instance of a duplicate through search and match capabilities. All other instances of a duplicate should be marked with a Duplicate Error Code and populated into an Error File. CC is to define a Duplicate Threshold, as for example 1% to start, although this threshold may change in the future. When a single partner file hits the Duplicate Threshold, Trustee should hold processing for that file and notify CC to determine how to proceed.

Some Partner Files will contain multiple records with the same Loyalty ID. Trustee is to populate an Occurrence Code for each unique Loyalty Number. The first occurrence of a Loyalty ID will have a 001 for Occurrence Code. Each additional occurrence of the Loyalty ID will increment by one in Occurrence Code. For Partner Files without vendor assigned Loyalty ID, Trustee is to assign a unique Loyalty Number and an Occurrence Code of 000. With next receipt of Partner File, if Loyalty Number is provided by vendor, Trustee will provide vendor assigned Loyalty ID instead of Trustee provided Loyalty ID.

Trustee can, for example, convert ten new Partner Files for each cycle. If more than 10 new files are received and Trustee cannot convert them within the target three week period, Trustee can ask CC to prioritize the top ten Partner Files to be converted/processed in current cycle, and which files should go into the next Partner Linking cycle. This overflow should be a rare condition because Trustee will convert new files as they are received. This overflow should only occur if Trustee receives a large number of new files right before the cutoff.

Trustee is to identify Mutual Customers as Partner Files are matched to any one CC APM database. Trustee is to return the CC Customer identification and Account Number based on a pre-established hierarchy such as the one presented below:

Trustee is to identify Partner File records not matching to any CC accounts on APM database. For Option 1, records not found in CC databases will be included in Partner Only file. They will have blanks in database fields representing CC information.

Trustee is to identify Errors/Non-Processed as any Partner File records that are: missing data required for matching, i.e., name and/or address; not able to be processed through Matching Engine for any reason; or duplicates. Trustee is to return Error codes defining the reason for the error. Trustee is to define the list of errors and recommend to CC for approval.

Trustee is to return Mutual Customers, Partner Only and Errors/Non-Processed records in separate data files to CC. For Priority Partners, there will be a fourth Loyalty No Match File.

Trustee is to automate which services will be provided by vendor as defined in the Partner Setup Form. For example, some vendors may not allow the Partner Only input data to go back to CC. Also, CC may want to choose different options for different partners—usually the options will be provided by a Credit Service Delivery group, so it would mean determining which files to be output for credit processing.

Trustee is to provide a Partner ID, File Input Generation Number and File Output Generation Number for each vendor to ensure that no Partner Files are lost in transmission/shipping to CC.

The first time a Partner File is received, Trustee will run a series of data diagnostics for that vendor. Trustee is to provide CC the diagnostic report for approval. Processing will not continue until CC approves the vendor for SPARC processing. Eventually, CC/Trustee will define thresholds on diagnostics to alert CC when a file has data issues and should be held while CC is alerted to the issues to determine how to proceed. Such diagnostics could be fed back to the vendors to help improve their data quality and coverage, and enhance the vendor-CC relationship.

Trustee is to notify CC of volume of Partner File to be included in each transmission/shipment to CC, in a control file for example.

Each Partner File can have some combination of the following input data:

| Field | Description | Required/ Optional | Priority of input for matching |
| --- | --- | --- | --- |
| First Name | Customer First Name | Optional | 1 |
| Middle Name | Customer Middle Name | Optional | 1 |
| Last Name | Customer Last Name | Required | 1 |

-continued

| Field | Description | Required/ Optional | Priority of input for matching |
| --- | --- | --- | --- |
| Name Suffix | Last Name suffix | Required | 1 |
| Home Address | Home address, city, state & postal code | at least one address is | 1 |
| Alternate Address | Different address, city, state & postal code than Home | Required | 1a |
| SSN | Social Security Number | Optional | 2 |
| DOB/YOB | Date of Birth/Year of Birth | Optional | 3 |
| Phone Number | Phone Number | Optional | 4 |
| Business Address | Business address, city, state & postal code | Optional | 5 |
| Business Name | Business Name | Optional | 5 |

Note:
Even though SSN is optional for general SPARC processing, in an alternative embodiment a matching engine can use SSN only for customer identification.

Trustee is to develop Matching Confidence Levels for different combinations of above input elements and provide one-time to CC. CC will use these confidence levels to set appropriate Partner Expectations for matching accuracy and help vendors understand the importance of providing as much input data as possible to achieve better match rates. These confidence levels are speculative but can be used as a guide.

Reporting output from the SPARC process should include overall counts for matches performed for each vendor including: input records; Mutual Customers; Partner Only files; Errors/Non-Processed files; Changes Over Time files.

A generic delivery method that can potentially be accessed by anyone (CC employees or Partners) should be employed.

Trustee is to return the information to CC in a flat file layout via Network Data Mover (NDM). Alternatively, Trustee is to return the information to CC by tape shipment. Trustee is to look into options for compressing the files before sending.

CC MIS will include: Customer/Prospect/Error counts/ Loyalty No Matches by partner; changed and new counts by Partner; migration from New/Changed/Prospect/Error to Customer by Partner If more than one Partner File is received for processing, then Trustee is to contact CC to determine how to proceed. The assumption is that Trustee will only process one Partner Input Generation File at a time.

Standard Partner Files can have 3 types of files:
1. Customer—will contain only Customer data
2. Partner only—will contain only Partner only data
3. Error—will contain only Error data Priority Partner Files can have 4 types of files:
1. Customer—will contain only Customer data
2. Partner only—will contain only Partner only data
3. Error—will contain only Error data
4. Loyalty The seven files listed above will be accompanied by a separate control file.

There will be seven different databases, and each control file will be written to a different database.

The seven files, as mentioned above, are logical and the physical file number may be more than seven; if for example, the files get split in transmission.

A feedback loop is to be created to ensure 100% resolution for CC owned portfolios for all partners processed. The initial requirements provided to Trustee are as follows:
  i. Co-Brand pre-feed process objective is to provide 100% resolution of matches via a file of CC portfolio customers to be provided to Trustee;
  ii. customers on pre-feed need not be processed through SPA Search & Match (saving transaction volume);

iii. data to be provided to Trustee on pre-feed will be driven by Trustee needs, e.g. Loyalty ID, TruVue ID, Scramble Acct Number, Name & Address, etc; and iv. where the customer on CC portfolio pre-feed file is not found in the Partner File, an output file of these records should be created (this is the Loyalty File referred to in previous requirements).

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it would be within the knowledge of one skilled in the art to effect such feature, structure, or characteristic in connection with other embodiments whether or not explicitly described.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures. Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method, comprising:
    directing, by a computer-based system for analyzing transaction account customer behavior, a first partner to provide a first partner list including a list of first partner customer names and first partner customer behavior information for each partner customer on the first partner list, wherein the first partner list contains confidential first partner customer information, wherein the first partner is identified by a partner identification number;
    receiving, by the computer-based system, instructions from the first partner indicating that the first partner is designated as a priority partner;
    processing, by the computer-based system, the first partner list received from the first partner, prior to processing any partner list received from any other partner not designated as a priority partner;
    preparing, by the computer-based system, a master customer list;
    providing, by the computer-based system, a third-party trustee with the master customer list containing a list of customer names for preparation of a mutual customer list, wherein the mutual customer list consists of a list of mutual customer names and partner customer behavior information for each customer whose name is on both the master customer list and a first partner list, wherein the first partner list is provided by a first partner at a first point in time, wherein the computer-based system includes a memory and non-transitory memory;
    preserving first partner customer information confidentially by receiving, at the computer-based system and from the third-party trustee, the mutual customer list including only the information associated with the identified mutual customers from the first partner list and the master customer list, and an updated mutual customer list, wherein the updated mutual customer list includes a list of mutual customer names and respective partner customer behavior information for each customer whose name is on both the master customer list and an updated partner list, wherein the updated partner list is provided by the first partner at a second point in time and includes a list of partner customer names and respective partner customer behavior information for each partner customer on the updated partner list;
    detecting, by the computer-based system, changes in the respective partner customer behavior information for at least one customer who is on both the mutual customer list and the updated mutual customer list;
    managing, by the computer-based system, risk in accordance with the changes in the respective partner customer behavior information;
    creating, by the computer-based system, a database for customers on the mutual customer list and the updated mutual customer list, wherein the database includes the list of mutual customer names and the respective partner customer behavior information;
    determining, by the computer-based system and based on customer behavior information, that an opportunity to provide a mutual customer with an incentive program exists; and
    providing, by the computer-based system, the mutual customer with an incentive program.

2. The method of claim 1, wherein the first point in time is before the at least one mutual customer is provided with the incentive program, and the second point in time is after the at least one mutual customer is provided with the incentive program, and further comprising evaluating how the incentive program affected customer behavior for the at least one mutual customer.

3. The method of claim 2, further comprising:
    providing at least one mutual customer with a customer service level in accordance with the changes in respective partner customer behavior information.

4. The method of claim 3, further comprising:
    assessing at least one mutual customer's credit worthiness in accordance with the changes in respective partner customer behavior information.

5. The method of claim 4, further comprising:
    entering into a contractual obligation with the partner to secure the partner customer names and respective partner customer behavior information for each customer on the first partner list; and
    ensuring that each step in the method adheres to the contractual obligation.

6. The method of claim 5, further comprising:
maintaining a security policy to secure the partner customer names and respective partner customer behavior information for each customer on the first partner list; and
ensuring that each step in the method adheres to the security policy.

7. A non-transitory computer-readable storage medium that stores instructions that, when executed by a computing device for analyzing transaction account customer behavior, cause the computing device to perform operations comprising:
directing, by the computing device, a first partner to provide a first partner list including a list of partner customer names and partner customer behavior information for each partner customer on the first partner list, wherein the first partner list contains confidential first partner customer information, wherein the first partner is identified by a partner identification number;
receiving, by the computing device, instructions from the first partner indicating that the first partner is designated as a priority partner;
processing, by the computing device, the first partner list received from the first partner prior to processing any partner list received from any other not designated as a priority partner;
preparing, by the computing device, a master customer list;
providing, by the computing device, a third-party trustee with the master customer list containing a list of customer names for preparation of a mutual customer list, wherein the mutual customer list consists of a list of mutual customer names and first partner customer behavior information for each customer whose name is on both the master customer list and a first partner list, wherein the first partner list is provided by a first partner at a first point in time, wherein the computer-based system includes a memory and non-transitory memory;
preserving first partner customer information confidentially by receiving, by the computing device and from the third-party trustee, the mutual customer list including only the information associated with the identified mutual customers from the first partner list and the master customer list, and an updated mutual customer list, wherein the updated mutual customer list includes a list of mutual customer names and respective partner customer behavior information for each customer whose name is on both the master customer list and an updated partner list, wherein the updated partner list is provided by the first partner at a second point in time and includes a list of partner customer names and respective partner customer behavior information for each partner customer on the updated partner list;
detecting, by the computing device, changes in the respective partner customer behavior information for at least one customer who is on both the mutual customer list and the updated mutual customer list; and;
managing, by the computing device, risk in accordance with the changes in the respective partner customer behavior information;
creating, by the computing device, a database for customers on the mutual customer list and the updated mutual customer list, wherein the database includes the list of mutual customer names and the respective partner customer behavior information;
determining, by the computing device and based on customer behavior information, that an opportunity to provide a mutual customer with an incentive program exists; and
providing, by the computing device, the mutual customer with an incentive program.

8. The computer-readable storage medium of claim 7, further causing the processing device to perform operations comprising adhering to a security protocol.

9. The computer-readable storage medium of claim 8, wherein the mutual customer list includes partner customer behavior information for a plurality of partners, and wherein the medium further causes the processing device to perform operations comprises indexing the list of mutual customers by respective partner.

10. The computer-readable storage medium of claim 9, further causing the processing device to perform operations comprising indexing the list of mutual customers in accordance with the changes in the respective partner customer behavior.

11. The computer-readable storage medium of claim 10, further causing the processing device to perform operations comprising calculating a credit ranking for at least one mutual customer in accordance with the changes in the respective partner customer behavior for the at least one mutual customer.

12. The computer-readable storage medium of claim 11, further causing the processing device to perform operations comprising preparing a promotional incentive to a customer on a prospective customer list.

13. A system for rewarding analyzing customer behavior, comprising:
a processor for analyzing transaction account customer behavior; and
a non-transitory memory in communication with the processor, the memory stores a plurality of processing instructions for directing the processor to:
direct, by the processor, a first partner to provide a first partner list including a list of partner customer names and respective partner customer behavior information for each partner customer on the first partner list, wherein the first partner list contains confidential first partner customer information, wherein the first partner is identified by a partner identification number;
receive, by the processor, instructions from the first partner indicating that the first partner is designated as a priority partner;
process, by the processor, the first partner list received form the first partner prior to processing any partner list received from any other partner not designated as a priority partner;
prepare, by the processor, a master customer list;
maintain, by the processor, the master customer list;
provide, by the processor, a third-party trustee with at least the list of customer names from the master customer list for creation of a mutual customer list containing common names from the master customer list and at least the first partner list, wherein the first partner list is provided by the first partner at a first point in time and includes first partner customer names and first partner customer behavior information for each customer on the first partner list;
preserve first partner customer information confidentially by receiving, by the processor, from the third-party trustee, the mutual customer list consisting of the names of the mutual customers and their respective first partner customer behavior information including only the information associated with the identified mutual customers from the first partner list and the master customer list; and analyzing, by the processor, the respective first, second, and master customer behavior information for at least one mutual customer to determine a pattern in the customer behavior, and manage, by the processor, risk in accordance with the partner customer behavior information;

creating, by the processor, a database for customers on the mutual customer list, wherein the database includes the list of mutual customer names and the respective partner customer behavior information;

determining, by the processor and based on customer behavior information, that an opportunity to provide a mutual customer with an incentive program exists; and providing, by the processor, the mutual customer with an incentive program.

14. The system of claim 13, wherein the creation of the mutual customer list also contains common names from a second partner customer list, wherein the second partner list includes second partner customer names and second partner customer behavior information for each customer on the second partner customer list and wherein the mutual customer list includes mutual customer names and their respective second partner customer behavior information.

15. The system of claim 14, further directing the processor to:

provide an updated partner list, wherein the updated partner list is provided by the partner at a second point in time and includes a list of partner customer names and respective partner customer behavior information for each partner customer on the updated partner list; and detect changes in the respective partner customer behavior information for at least one customer who is on both the mutual customer list and the updated mutual customer list.

16. The system of claim 14, further comprising analyzing the respective first, second, and master customer behavior information for at least one mutual customer to determine a pattern in the customer behavior.

* * * * *